United States Patent
Henry et al.

(10) Patent No.: US 12,069,976 B2
(45) Date of Patent: *Aug. 27, 2024

(54) SYSTEMS AND METHODS FOR DETERMINING RESIDUE COVERAGE OF A FIELD

(71) Applicant: CNH Industrial Canada, Ltd., Saskatoon (CA)

(72) Inventors: James W. Henry, Saskatoon (CA); Christopher Nicholas Warwick, Hertfordshire (GB); David John Powell, Cambridge (GB)

(73) Assignee: CNH Industrial Canada, Ltd., Saskatoon (CA)

( * ) Notice: Subject to any disclaimer, the term of this patent is extended or adjusted under 35 U.S.C. 154(b) by 733 days.

This patent is subject to a terminal disclaimer.

(21) Appl. No.: 17/174,862

(22) Filed: Feb. 12, 2021

(65) Prior Publication Data
US 2022/0256764 A1    Aug. 18, 2022

(51) Int. Cl.
*A01B 79/00*    (2006.01)
*A01C 21/00*    (2006.01)
*A01B 49/02*    (2006.01)

(52) U.S. Cl.
CPC .......... *A01B 79/005* (2013.01); *A01C 21/005* (2013.01); *A01C 21/007* (2013.01); *A01B 49/027* (2013.01)

(58) Field of Classification Search
CPC ... A01B 79/005; A01B 49/027; A01C 21/005; A01C 21/007
See application file for complete search history.

(56) References Cited

U.S. PATENT DOCUMENTS

| | | | |
|---|---|---|---|
| 9,030,549 B2 | 5/2015 | Redden | |
| 9,282,688 B2 * | 3/2016 | Casper | A01B 17/002 |
| 9,489,576 B2 | 11/2016 | Johnson et al. | |
| 9,554,098 B2 * | 1/2017 | Casper | A01B 79/00 |
| 10,262,206 B2 * | 4/2019 | Posselius | A01B 76/00 |

(Continued)

OTHER PUBLICATIONS

Hamuda et al., "A Survey of Image Processing Techniques", Computers and Electronics in Agriculture, Issue 125, National University of Ireland, Dated 2016. (16 pages) at http://agri.ckcest.cn/ass/NK006-20160808005.pdf.

(Continued)

*Primary Examiner* — Gertrude Arthur Jeanglaude
(74) *Attorney, Agent, or Firm* — DORITY & MANNING, P.A.

(57) ABSTRACT

A method for determining residue coverage of a field includes receiving, with a computing system, a captured image depicting an imaged portion of a field from one or more imaging devices. Furthermore, the method includes determining, with the computing system, an image gradient orientation at each of a plurality of pixels within the captured image. Additionally, the method includes determining, with the computing system, a plurality of image gradient orientation densities associated with the captured image based on the determined image gradient orientations. Moreover, the method includes determining, with the computing system, a residue coverage parameter associated with the imaged portion of the field based on the determined plurality of image gradient orientation densities.

20 Claims, 5 Drawing Sheets

(56) References Cited

U.S. PATENT DOCUMENTS

| | | |
|---|---|---|
| 10,438,343 B2 | 10/2019 | Baurer et al. |
| 10,492,353 B2 | 12/2019 | Kovach et al. |
| 10,537,062 B2 | 1/2020 | Brubaker |
| 11,538,180 B2* | 12/2022 | Henry .................. G06T 7/60 |
| 2014/0301607 A1 | 10/2014 | Anderson et al. |
| 2015/0305224 A1 | 10/2015 | Casper et al. |
| 2017/0112043 A1 | 4/2017 | Nair et al. |
| 2019/0150357 A1 | 5/2019 | Wu et al. |
| 2019/0392573 A1 | 12/2019 | Ferrari et al. |

OTHER PUBLICATIONS

Bannari et al., "Estimating and Mapping Crop Residues Cover on Agricultural Lands Using Hyperspectral and IKONOS Data", Remote Sensing of Environment, Issue 104, University of Ottawa, Dated 2006 (13 pages) https://www.academia.edu/download/49817056/Estimating_and_mapping_crop_residues_cov20161023-28382-kzz6fk.pdf.

Extended European Search Report for corresponding EP Application No. 22156154 dated Jul. 15, 2022 (7 pages).

* cited by examiner

SYSTEMS AND METHODS FOR DETERMINING RESIDUE COVERAGE OF A FIELD

FIELD

Field of the Invention

The present subject matter relates generally to the acquisition and analysis of surface condition data associated with an agricultural field and, more particularly, to systems and methods for determining the residue coverage of an agricultural field.

Background of the Invention

Crop residue generally refers to the vegetation (e.g., straw, chaff, husks, cobs) remaining on the soil surface following the performance of a given agricultural operation, such as a harvesting operation or a tillage operation. For various reasons, it is important to maintain a given amount of crop residue within a field following an agricultural operation. Specifically, crop residue remaining within the field can help maintain the content of organic matter within the soil and protect the soil from wind and water erosion. However, in some cases, leaving an excessive amount of crop residue within a field can have a negative effect on the productivity potential of the soil, such as by slowing down the warming of the soil at planting time and/or by slowing down seed germination. As such, the ability to monitor and/or adjust the amount of crop residue remaining within a field can be important to maintaining a healthy, productive field, particularly when it comes to performing tillage operations.

In this respect, systems and methods have been developed that estimate crop residue coverage of an agricultural field from images captured of the field. While such methods generally work well, further improvement are needed. For example, the accuracy of these systems and methods of determining residue coverage may suffer in certain ambient lighting conditions (e.g., in direct sunlight and/or shadows) and when certain colors of soil and/or residue are present within the field (e.g., when the soil and residue have similar colors).

Accordingly, an improved system and method for determining residue coverage of a field would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a method for determining residue coverage of a field. The method includes receiving, with a computing system, a captured image depicting an imaged portion of a field from one or more imaging devices. Furthermore, the method includes determining, with the computing system, an image gradient orientation at each of a plurality of pixels within the captured image. Additionally, the method includes determining, with the computing system, a plurality of image gradient orientation densities associated with the captured image based on the determined image gradient orientations. Moreover, the method includes determining, with the computing system, a residue coverage parameter associated with the imaged portion of the field based on the determined plurality of image gradient orientation densities.

In another aspect, the present subject matter is directed to a system for determining residue coverage of a field. The system includes an imaging device configured to capture images of a field and a computing system communicatively coupled to the imaging device. The computing system includes a processor and associated memory. The memory, in turn, stores instructions that, when implemented by the processor, configure the computing system to receive a captured image depicting an imaged portion of the field from the imaging device. Furthermore, the computing system is configured to determine an image gradient orientation at each of a plurality of pixels within the captured image. Additionally, the computing system is configured to determine a plurality of image gradient orientation densities associated with captured image the based on the determined image gradient orientations. Moreover, the computing system is configured to determine a residue coverage parameter associated with the imaged portion of the field based on the determined plurality of image gradient orientation densities.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
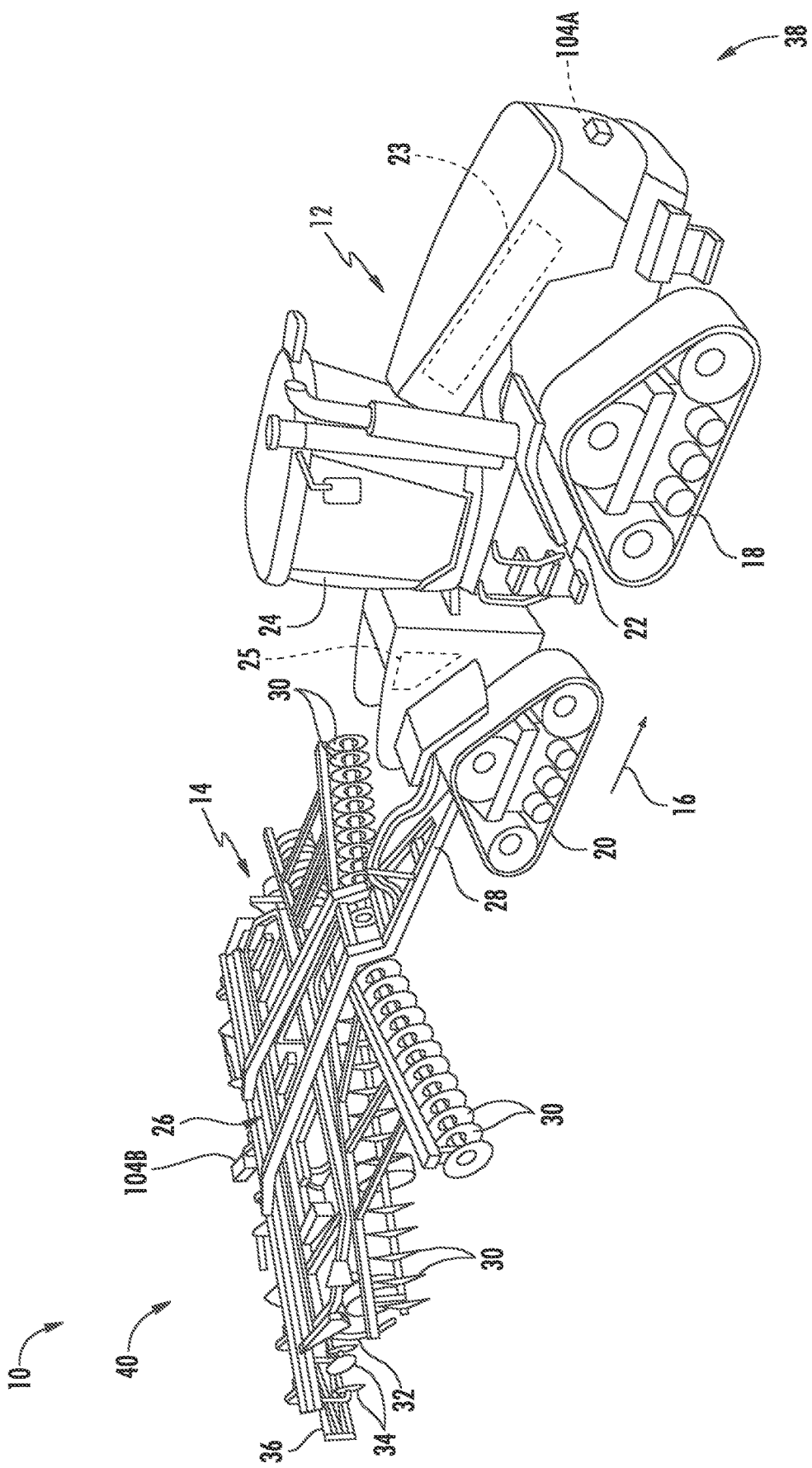
FIG. 1 illustrates a perspective view of one embodiment of an agricultural machine in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining the residue coverage of a field. The residue coverage of a field, in turn, generally refers to the percentage or proportion of a field surface on which residue is present. For example, when a given portion of a field is determined to have thirty percent residue coverage, residue is present on thirty percent of the surface area of the given portion of the field. As mentioned above, it is generally desirable for the residue coverage of the field to be within a specified range. When the residue coverage is too low, soil erosion and/or nutrient loss may occur within the field. Conversely, when residue coverage is too high, the soil may not be warm enough at the time of planting and/or the seed germination may be too slow.

In accordance with aspects of the present subject matter, the disclosed systems and methods utilize computer vision techniques and/or image processing algorithms to determine the residue coverage of imaged portions of an agricultural field. In several embodiments, a computing system may receive a captured image depicting an imaged portion of a field from one or more imaging devices (e.g., a camera assembly). Furthermore, the computing system may determine an image gradient orientation or direction at each of a plurality of pixels within the captured image. Moreover, the computing system may determine an image gradient orientation density at each of the plurality of pixels. Specifically, for a given pixel of the plurality of pixels, the corresponding image gradient density is the spatial average of the image gradient orientations of the given pixel and several of its neighboring pixels. Thereafter, the computing system may determine a residue coverage parameter (e.g., the percent residue coverage) associated with the imaged portion of the field based on the determined image gradient orientation densities.

Determining the residue coverage of the field based on the image gradients or texture depicted within captured images improves the accuracy the residue coverage determinations. As mentioned above, the accuracy of systems and methods that rely on color differences within captured images to determine residue coverage may suffer in certain ambient lighting conditions and when certain colors of soil and/or residue are present within the field. However, as described above, the disclosed systems and methods rely image gradients to make residue coverage determinations. Specifically, the residue present within the field is typically characterized by a high number of gradients in the same orientation due to the straightness of the residue pieces, while gradients associated with soil are more randomly oriented. In this respect, based on the gradients within the captured images, the residue coverage of the field can be determined. Moreover, the ambient lighting conditions and the color of the soil and residue generally do not affect this texture-based analysis in same manner as they would for color-based analysis of the captured images. Thus, the systems and methods disclosed herein provide improved residue coverage determination accuracy, particularly as field conditions vary.

Referring now to drawings, FIG. 1 illustrates a perspective view of one embodiment of an agricultural machine 10 in accordance with aspects of the present subject matter. As shown, in the illustrated embodiment, the agricultural machine 10 includes a work vehicle 12 and an associated agricultural implement 14. In general, the work vehicle 12 is configured to tow the implement 14 across a field in a direction of travel (e.g., as indicated by arrow 16 in FIG. 1). In the illustrated embodiment, the work vehicle 12 is configured as an agricultural tractor and the implement 14 is configured as an associated tillage implement. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a planter. Furthermore, it should be appreciated that the agricultural machine 10 may correspond to any suitable powered and/or unpowered agricultural machine (including suitable vehicles and/or equipment, such as only a work vehicle or only an implement). Additionally, the agricultural machine 10 may include more than two associated vehicles, implements, and/or the like (e.g., a tractor, a planter, and an associated air cart).

As shown in FIG. 1, the work vehicle 12 includes a pair of front track assemblies 18, a pair or rear track assemblies 20, and a frame or chassis 22 coupled to and supported by the track assemblies 18, 20. An operator's cab 24 may be supported by a portion of the chassis 22 and may house various input devices for permitting an operator to control the operation of one or more components of the work vehicle 12 and/or one or more components of the implement 14. Additionally, as is generally understood, the work vehicle 12 may include an engine 23 and a transmission 25 mounted on the chassis 22. The transmission 25 may be operably coupled to the engine 23 and may provide variably adjusted gear ratios for transferring engine power to the track assemblies 18, 20 via a drive axle assembly (not shown) (or via axles if multiple drive axles are employed).

Additionally, as shown in FIG. 1, the implement 14 may generally include a carriage frame assembly 26 configured to be towed by the work vehicle 12 via a pull hitch or tow bar 28 in the direction of travel 16 of the vehicle 12. As is generally understood, the carriage frame assembly 26 may be configured to support a plurality of ground-engaging tools, such as a plurality of shanks, disk blades, leveling blades, basket assemblies, tines, spikes, and/or the like. For example, in the illustrated embodiment, the carriage frame assembly 26 is configured to support various gangs of disc blades 30, a plurality of ground engaging shanks 32, a plurality of leveling blades 34, and a plurality of crumbler wheels or basket assemblies 36. However, in alternative embodiments, the carriage frame assembly 26 may be configured to support any other suitable ground engaging tools and/or combination of ground engaging tools. In several embodiments, the various ground-engaging tools may be configured to perform a tillage operation or any other suitable ground-engaging operation across the field along which the implement 14 is being towed. It should be understood that, in addition to being towed by the work vehicle 12, the implement 14 may also be a semi-mounted implement connected to the work vehicle 12 via a two-point hitch (not shown) or the implement 14 may be a fully mounted implement (e.g., mounted the work vehicle's 12 three-point hitch (not shown)).

It should be appreciated that the configuration of the agricultural machine 10 described above and shown in FIG. 1 is provided only to place the present subject matter in an exemplary field of use. Thus, it should be appreciated that the present subject matter may be readily adaptable to any manner of machine configuration, including any suitable work vehicle configuration and/or implement configuration. For example, in an alternative embodiment of the work vehicle 12, a separate frame or chassis may be provided to which the engine, transmission, and drive axle assembly are coupled, a configuration common in smaller tractors. Still other configurations may use an articulated chassis to steer the work vehicle 10 or rely on tires/wheels in lieu of the track assemblies 14, 16. Similarly, as indicated above, the carriage frame assembly 26 of the implement 12 may be configured to support any other suitable combination of type of ground-engaging tools.

Furthermore, in accordance with aspects of the present subject matter, the agricultural machine 10 may include one or more imaging devices 104 coupled thereto and/or supported thereon. As will be described below, each imaging device(s) 104 may be configured to capture images or other data relating to one or more conditions of the field along which the machine 10 is being traversed. Specifically, in several embodiments, the imaging device(s) 104 may be used to collect data associated with one or more surface conditions of the field, such as one or more conditions relating to crop residue, soil clods, and/or surface irregularities (e.g., ridges and/or valleys) within the field. For instance, as will be described below, the imaging device(s) 104 may be used to collect data associated with the determination of the residue coverage of the field.

In several embodiments, the imaging device(s) 104 may be provided in operative association with the agricultural machine 10 such that the imaging device(s) 104 has a field of view directed towards a portion(s) of the field adjacent to the work vehicle 12 and/or the implement 14, such as a portion(s) of the field disposed in front of, behind, and/or along one or both of the sides of the work vehicle 12 and/or the implement 14. For example, as shown in FIG. 1, in one embodiment, an imaging device(s) 104A may be provided at a forward end 38 of the work vehicle 12 to allow the imaging device(s) 104A to capture images and related data of a section of the field disposed in front of the work vehicle 12. Such a forward-located imaging device(s) 104A may allow pre-tillage images of the field to be captured for monitoring or determining surface conditions of the field prior to the performance of a tillage operation. Similarly, as shown in FIG. 1, a second imaging device(s) 104B may be provided at or adjacent to an aft end 40 of the implement 14 to allow the imaging device(s) 104B to capture images and related data of a section of the field disposed behind the implement 14. Such an aft-located imaging device(s) 104B may allow post-tillage images of the field to be captured for monitoring or determining surface conditions of the field after the performance of a tillage operation.

It should be appreciated that, in alternative embodiments, the imaging device(s) 104 may be installed at any other suitable location(s) on the work vehicle 12 and/or the implement 14. In addition, it should be appreciated that, in other embodiments, the agricultural machine 10 may only include a single imaging device(s) 104 mounted on either the work vehicle 12 or the implement 14 or may include more than two imaging device(s) 104 mounted on the work vehicle 12 and/or the implement 14. Moreover, it should be appreciated that each imaging device(s) 104 may be configured to be mounted or otherwise supported relative to a portion of the agricultural machine 10 using any suitable mounting/support structure. For instance, in one embodiment, each imaging device(s) 104 may be directly or indirectly mounted to a portion of the work vehicle 12 and/or the implement 14. Specifically, in one embodiment, suitable mounting structure (e.g., mounting arms, brackets, trays, etc.) may be used to support each imaging device(s) 104 out in front of the vehicle 12 or behind the implement 14 (e.g., in a cantilevered arrangement) to allow the imaging device (s) 104 to obtain the desired field of view, including the desired orientation of the device's field of view relative to the field (e.g., a straight-down view oriented generally perpendicular to the surface of the field).

In general, the imaging device(s) 104 may correspond to any suitable device(s) or other assembly configured to capture images of the field. For instance, in several embodiments, the imaging device(s) 104 may correspond to a stereo camera assembly having first and second cameras 106, 108 (FIG. 2) incorporated therein or otherwise forming a part thereof. In such embodiments, the stereo camera assembly may be used to capture both two-dimensional and three-dimensional images of the field. Specifically, each camera may include a lens and a separate image sensor for capturing two-dimensional images. Additionally, by simultaneously capturing an image of the same portion of the field with each camera, the separate images can be combined, compared, and/or otherwise processed to extract three-dimensional information about such portion of the field. For example, by comparing the images captured by each camera, a depth image can be generated that allows the scene depth to be determined (e.g., relative to the camera) at each corresponding pixel location within the imaged portion of the field. As a result, the relative depth of specific features or points within the field may be determined. It should be appreciated that, in addition to a stereo camera assembly or as an alternative thereto, the agricultural machine 10 may include any other suitable type of imaging device(s) 104. For instance, suitable imaging device(s) 104 may also include single or non-stereo cameras, spectroscope cameras, multi-spectrum cameras, and/or the like.

Figure 2:
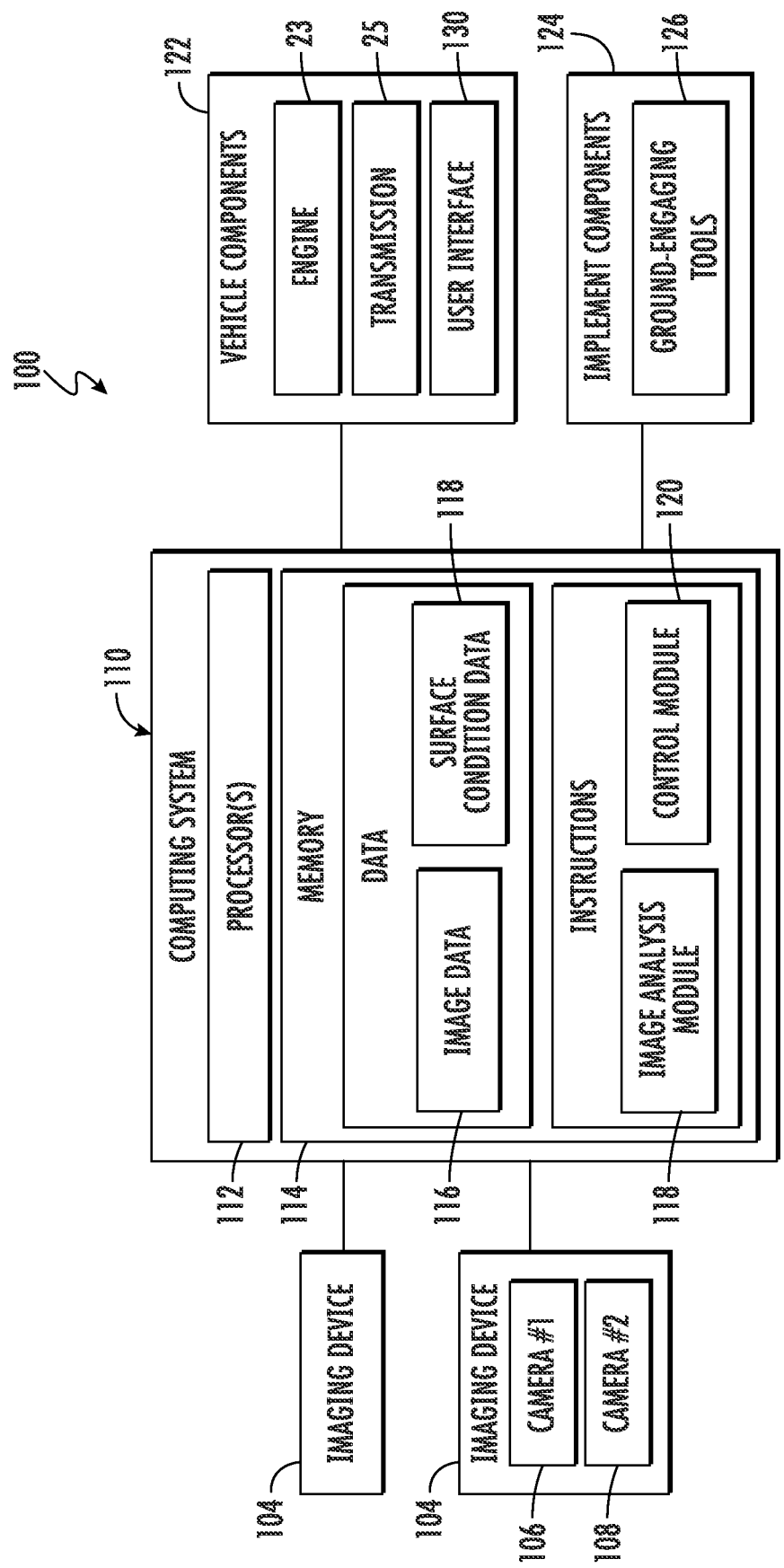
FIG. 2 illustrates a schematic view of one embodiment of a system for determining residue coverage of a field in accordance with aspects of the present subject matter.

Referring now to FIG. 2, a schematic view of one embodiment of a system 100 for monitoring one or more surface conditions associated with a field is illustrated in accordance with aspects of the present subject matter. In general, the system 100 will be described herein with reference to the agricultural machine 10 described above with reference to FIG. 1. However, it should be appreciated by those of ordinary skill in the art that the disclosed system 100 may generally be utilized with agricultural machines having any other suitable machine configuration.

As shown in FIG. 2, the system 100 may include one or more components of the agricultural machine 10 described above with reference to FIG. 1. For example, in several embodiments, the system 100 may include one or more of the imaging device(s) (e.g., imaging devices 104 shown in FIG. 1) configured to capture images of a portion(s) of the field disposed adjacent to the work vehicle 12 and or the implement 14. As indicated above, in one embodiment, one or more of the imaging device(s) 104 may correspond to a stereo camera assembly including first and second cameras 106, 108 for capturing both two-dimensional and three-dimensional images of the field. Additionally, the system 100 may include or be associated with one or more other components of the work vehicle 12 and/or the implement 14.

The system 100 may further include a computing system 110 communicatively coupled to the imaging device(s) 104. In several embodiments, the computing system 110 may be configured to receive and process the images captured by the imaging device(s) 104 to allow one or more surface conditions of the imaged portions of the field to be determined. For instance, as will be described below, the computing system 110 may be configured to execute one or more suitable image processing algorithms for determining the residue coverage of the field based on the captured images.

In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the image processing algorithm(s) and/or related method(s) described below. In addition, the computing system 110 may also include various other suitable components, such as a communications circuit or module, one or more input/output channels, a data/control bus and/or the like.

It should be appreciated that the computing system 110 may correspond to an existing controller of the work vehicle 12 or the implement 14 or the computing system 110 may correspond to a separate processing device. For instance, in one embodiment, the computing system 110 may form all or part of a separate plug-in module or computing device that is installed relative to the work vehicle 12 or implement 14 to allow for the disclosed system and method to be implemented without requiring additional software to be uploaded onto existing control devices of the work vehicle 12 or implement 14.

In several embodiments, the memory 114 of the computing system 110 may include one or more databases for storing information received and/or generated by the computing system 110. For instance, as shown in FIG. 2, the memory 114 may include an image database 116 storing data associated with the images captured by the imaging device(s) 104, including the images themselves and/or data deriving from the images (e.g., disparity maps or depth images generated based on the images captured by the imaging device(s) 104). Additionally, the memory 114 may include a surface condition database 119 storing data associated with the surface condition(s) being monitored by the computing system 110. For instance, as will be described below, the images and related data deriving from the imaging device(s) 104 may be used to determine the residue coverage of the field. In such instance, the residue coverage data generated by the computing system 110 may be stored within the surface condition database 119 for subsequent processing and/or analysis.

Moreover, as shown in FIG. 2, in several embodiments, the instructions stored within the memory 114 of the computing system 110 may be executed by the processor(s) 112 to implement an image analysis module 118. In general, the image analysis module 118 may be configured to process/analyze the images received from the imaging device(s) 104 and/or the data deriving therefrom to estimate or determine one or more surface conditions associated with the field. Specifically, in several embodiments, the image analysis module 118 may be configured to execute one or more image processing algorithms, such as the imaging processing algorithms described herein, to allow the residue coverage of the field to be estimated or determined by the computing system 110.

Referring still to FIG. 2, in one embodiment, the instructions stored within the memory 114 of the computing system 110 may also be executed by the processor(s) 112 to implement a control module 121. In general, the control module 121 may be configured to electronically control the operation of one or more components of the agricultural machine 10. For instance, in several embodiments, the control module 121 may be configured to control the operation of the agricultural machine 10 based on the monitored surface condition(s) of the field. Such control may include controlling the operation of one or more components 122 of the work vehicle 12, such as the engine 23 and/or the transmission 25 of the vehicle 12 to automatically adjust the ground speed of the agricultural machine 10. In addition (or as an alternative thereto), the control module 121 may be configured to electronically control the operation of one or more components 124 of the implement 14. For instance, the control module 121 may be configured to adjust the operating parameters (e.g., penetration depth, down force/pressure, etc.) associated with one or more of the ground-engaging tools 126 of the implement 14 (e.g., the disc blades 30, shanks 32, leveling blades 34, and/or basket assemblies 36) to proactively or reactively adjust the operation of the implement 14 in view of the monitored surface condition(s).

In several embodiments, the computing system 110 may also be communicatively coupled to a user interface, such as a user interface 130 housed within the cab 24 of the work vehicle 12 or at any other suitable location. The user interface 130 may be configured to provide feedback to the operator of the agricultural machine 10. Thus, the user interface 130 may include one or more feedback devices (not shown), such as display screens, speakers, warning lights, and/or the like, which are configured to communicate such feedback. In addition, some embodiments of the user interface 130 may include one or more input devices (not shown), such as touchscreens, keypads, touchpads, knobs, buttons, sliders, switches, mice, microphones, and/or the like, which are configured to receive user inputs from the operator.

It should be appreciated that, although the various control functions and/or actions will generally be described herein as being executed by the computing system 110, one or more of such control functions/actions (or portions thereof) may be executed by a separate computing system or may be distributed across two or more computing systems (including, for example, the computing system 110 and a separate computing system). For instance, in one embodiment, the computing system 110 may be configured to acquire data from the imaging device(s) 104 for subsequent processing and/or analysis by a separate computing system (e.g., a computing system associated with a remote server). In another embodiment, the computing system 110 may be configured to execute the image analysis module 118 to determine and/or monitor one or more surface conditions within the field, while a separate computing system (e.g., a vehicle computing system associated with the agricultural machine 10) may be configured to execute the control module 120 to control the operation of the agricultural machine 10 based on data and/or instructions transmitted from the computing system 110 that are associated with the monitored surface condition(s).

Figure 3:
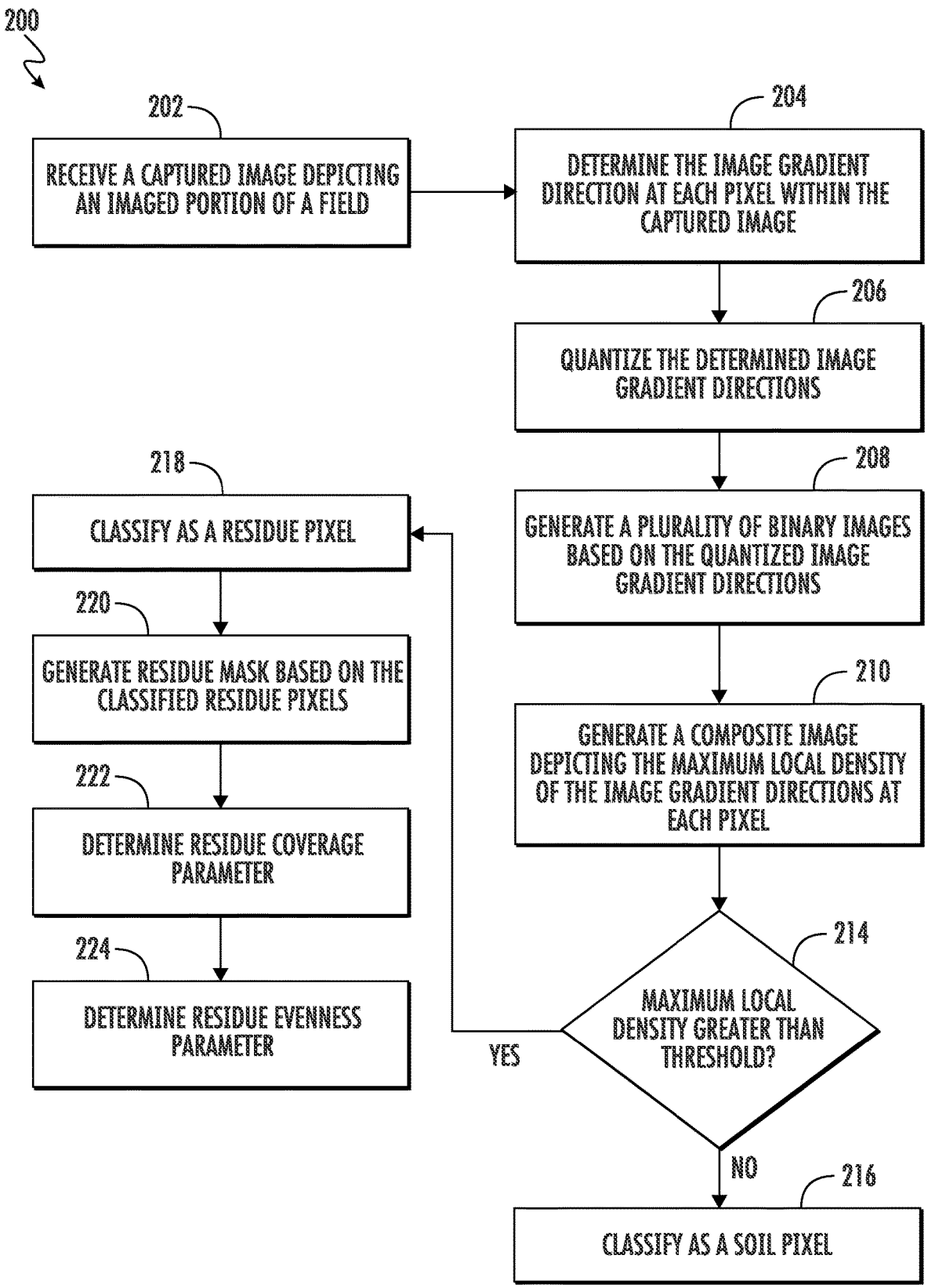
FIG. 3 illustrates a flow diagram providing one embodiment of example control logic for determining residue coverage of a field in accordance with aspects of the present subject matter.

Referring now to FIG. 3, a flow diagram of one embodiment of example control logic 200 that may be executed by the computing system 110 (or any other suitable computing system) for determining residue coverage within imaged portions of a field is illustrated in accordance with aspects of the present subject matter. Specifically, the control logic 200 shown in FIG. 3 is representative of steps of one embodiment of an image processing algorithm that can be executed to determine residue coverage within imaged portions of a field with substantial accuracy and without requiring substantial computing resources and/or processing time. Thus, in several embodiments, the control logic 200 may be advantageously utilized in association with a system installed on or forming part of an agricultural machine to allow for real-time determination of residue coverage within a field as the machine is traversed across the field during the performance of an agricultural operation. However, in other embodiments, the control logic 200 may be used in association with any other suitable system, application, and/or the like for detecting residue bunches within a field.

As shown in FIG. 3, at (202), the control logic 200 includes receiving a captured image of an imaged portion of the field. For example, as indicated above, the computing system 110 may be communicatively coupled to the imaging device(s) 104, thereby allowing images captured by the imaging device(s) 104 to be transmitted to and received by the computing system 110. In several embodiments, the image(s) received of each imaged portion of the field may correspond to a two-dimensional image(s). Alternatively, the image(s) received of each imaged portion of the field may correspond to a three-dimensional image(s). After receiving the captured image(s), the computing system 110 may be configured to preprocess the image(s). For example, in several embodiments, the computing system 110 may convert the received to image(s) in a gray-scale image(s). Such a conversion simplifies subsequent images processing by providing a single channel image(s) for the computing system 110 to analyze. In addition, in some embodiments, the computing system 110 may be configured to smooth the received image(s) to remove noise therefrom.

For the purposes of clarity, the below steps of the control logic 200 will be described in the context of processing a single captured image. These steps may be repeated on each subsequently captured image to make residue coverage determinations for the imaged portion of the field associated with each subsequent image.

At (204), the control logic 200 includes determining the image gradient orientation at each pixel within the captured image. More specifically, in several embodiments, the computing system 110 may be configured to analyze or process a captured image (e.g., the image received at (202)) to determine the image gradient at each pixel within the captured image. In such embodiments, the determined image gradient at each pixel includes two components: the magnitude of the gradient in the x-direction and the magnitude of the gradient in the y-direction. Thus, the computing system 110 may calculate the orientation or direction of the image gradient at each pixel based on the corresponding magnitudes of the gradients in the x- and y-directions.

As will be described below, the determined image gradient orientations may subsequently be used to determine or estimate the residue coverage of the field. Specifically, the residue present within the field is typically characterized by a high number of gradients in the same orientation due to the straightness of the residue pieces. Conversely, the gradients of the soil are more randomly oriented. Thus, by identifying the gradient orientations within the images, the pixels within the captured image can be analyzed and classified as "residue pixels" or "non-reside pixels" (e.g., "soil pixels"). Thereafter, based on the classified pixels within the captured image, the residue coverage of the field can be determined.

Furthermore, at (206), the control logic 200 includes quantizing the determined image gradient orientations at each of pixels. Specifically, in several embodiments, the computing system 110 may be configured to quantize each of the determined image gradient orientations within the captured image (e.g., the gradient orientations determined at (204)) as one of a predetermined plurality of image gradient orientations. That is, at (206), the computing system 110 may approximate each of the determined image gradient orientations as one of a fixed set of predetermined image gradient orientations to reduce the number of different image gradient orientations within the image. In this respect, reducing the number of gradient orientations or directions may generally simplify the subsequent analysis of the image and reduce the computing resources needed for such analysis. For example, in one embodiment, the computing system 110 may quantize each of the determined image gradient orientations into one of nine gradient orientations. However, in alternative embodiments, the computing system 110 may quantize the determined image gradient orientations in any other suitable number of gradient orientations.

Figure 4:
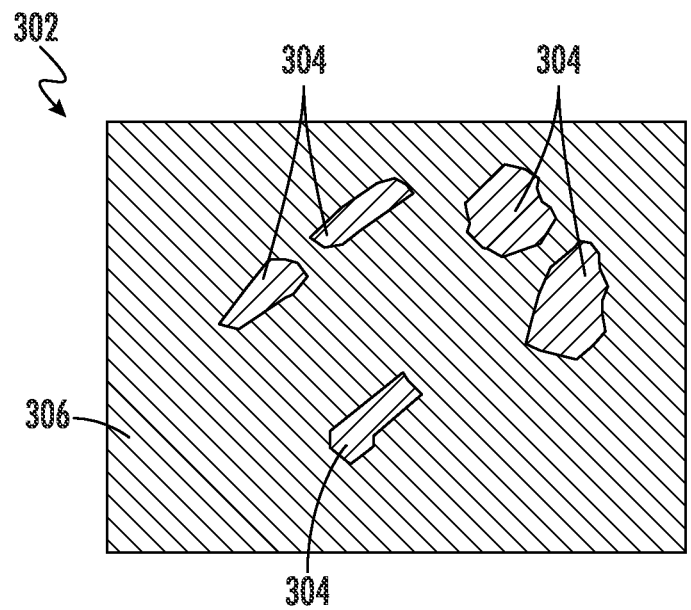
FIG. 4 illustrates an example binary image that identifies the pixels within an image of the field having a particular quantized image gradient orientation in accordance with aspects of the present subject matter.

Additionally, at (208), the control logic 200 includes generating a plurality of binary images based on the quantized image gradient orientations. In general, each binary image may correspond to one of the quantized image gradient orientations (i.e., one of the predetermined plurality of image gradient orientations into which the determined gradient orientations are quantized). As such, each binary image depicts the pixels within the captured image having the corresponding image gradient orientation and the pixels within the image not having the corresponding image gradient orientation. Thus, the binary image depicts all of the pixels not having its image gradient orientation as the same. For example, FIG. 4 illustrates an example binary image 302 corresponding to a particular quantized image gradient orientation. The example binary image 302 illustrates regions of pixels having the corresponding quantized image gradient orientation (indicated by cross-hatched areas 304) and a region of pixels not having the corresponding quantized image gradient orientation (indicated by cross-hatched area 306).

Referring again to FIG. 3, in several embodiments, at (208), the computing system 110 may be configured to generate a binary image corresponding to each quantized image orientation based on the quantized image gradients associated with the captured image. For example, as mentioned above, in one embodiment, the computing system 110 may quantize the determined image gradient orientations into one of nine predetermined gradient orientations. In such an embodiment, the computing system 110 may generate nine binary images, with each generated binary image depicting the pixels (or groups of pixels) having the corresponding quantized gradient orientation and the pixels within the image not having the corresponding image gradient orientation. Alternatively, the computing system 110 may generate any other suitable number of binary images. In several embodiments, (206) and (208) of the control logic 200 may be performed simultaneously as a single step.

At (210), the control logic 200 includes generating a composite image depicting the local maximum density of the image gradient orientations at each pixel within the captured image. Specifically, in several embodiments, the computing system 110 may be configured to the determine the density of the image gradient orientations for a plurality of pixels within each of the generated binary images. The density of the image gradient orientations for a given pixel is, in turn, the spatial average of the image gradient orientations depicted within the corresponding binary image (e.g., the spatial average of the gradient orientation associated with the binary image, which may be indicated as a "1," and the gradient orientations not associated with the binary image, which may be indicated as a "0") of the given pixel and several of its neighboring pixels. Thus, the image gradient density generally provides an indication of how strongly the gradient orientations in region surrounding the given pixel correspond to a particular quantized image gradient orientation.

In several embodiments, at (210), the computing system 110 may be configured to analyze each binary image to determine the image gradient orientation densities of each pixel therein. More specifically, the computing system 110 may blur and subsequently downsample each binary image to determine the image gradient orientation densities at each pixel. By blurring and downsampling each binary image, a corresponding gradient orientation density image is created from each binary image. In general, to blur the binary images, the computing system 110 may perform a 2D convolution of on each binary image with a kernel. The kernel is, in turn, a 2D array of pixels that is typically much smaller than the binary image (e.g., five-by-five group of pixels). The size of the kernel and the value of the pixels within the kernel generally define the size of the group or neighborhood over which each pixel is blurred. Thus, the value of each blurred pixel is determined by a group of other nearby pixels and each pixel ends up being used in many such groups. For example, the computing system 110 may filter each binary image with a two-dimensional Gaussian kernel to create the corresponding blurred image. Thus, after blurring and downsampling, each density image depicts the image gradient density at each region within the image.

Moreover, at (210), the computing system 110 may generate the composite image based on the plurality of blurred and downsampled images (i.e., the density images). Specifically, as mentioned above, the composite image depicts the local maximum density of the image gradient orientations at each pixel within the captured image. In this respect, the computing system 110 may analyze each of the plurality of blurred and downsampled images to determine the local maximum density of the image gradient orientations at each pixel across the plurality of blurred and downsampled images. The determined local maximum density, in turn, indicates which of the quantized gradient orientations that is most prevalent within the immediate area of each pixel. Thereafter, the computing system 110 may generate the composite image based on the determined local maximum densities of the image gradient orientations. The generated composite image may also depict the quantized image gradient orientation at which the maximum local density occurs at each pixel within the composite image.

At (214), the control logic 200 includes determining whether the determined maximum local density of each pixel within the image exceeds a threshold density value. Specifically, in several embodiments, the computing system 110 may be configured to compare the determined maximum local density associated with each pixel within the composite image to a threshold density value. When the maximum local density associated with a given pixel is less than or equal to the threshold density value, the computing system 110 may be configured to classify (e.g., at 216) such pixel as a "non-residue pixel," such as a "soil pixel." However, when the maximum local density associated with a given pixel is greater than the threshold density value, the computing system 110 may be configured to classify (e.g., at 218) such pixel as a "residue pixel." Thus, the computing system 110 may be configured to analyze the pixels contained within the composite image in view of the threshold density value and classify each pixel as either a "non-residue residue pixel" or a "residue pixel."

The threshold density value may generally correspond to a fixed value or may be selected or determined based on the current residue conditions within the field. For instance, in one embodiment, the threshold density value may correspond to an operator-selected value based on observed conditions or be calculated based on sensed surface conditions associated with the residue within the field.

Figure 5:
FIG. 5 illustrates an example residue mask that identifies "residue pixels" (as opposed to "non-residue pixels") within an image of a field in accordance with aspects of the present subject matter.

Furthermore, at (220), the control logic 200 includes generating a residue mask associated with the imaged portion of the field. Specifically, the computing system 110 may be configured to generate the residue mask based on the classified pixels in the composite image. Thus, the residue mask may generally depict the locations of pixels classified as residue within the composite image (e.g., as classified at (218)). In some embodiments, the computing system 110 may perform morphological opening and/or closing operations to fill out the residue portions of the composite image (e.g., to connect nearby groups residue pixels that are separated from each other, but likely form the same piece of residue) as part of generating the residue mask. For instance, FIG. 5 illustrates an example residue mask 308 associated with an imaged portion of a field in which the "residue pixels" are cross-hatched to indicate the crop residue within the field, with the remainder of the pixels (i.e., the "non-residue pixels") that are not cross-hatched being indicative of soil or other non-residue materials/objects within the field.

Moreover, at (222), the control logic 200 includes determining a residue coverage parameter associated with the image portion of the field. Specifically, in several embodiments, the computing system 110 may be configured to determine a residue coverage parameter (e.g., the residue coverage percentage of the imaged portion of the field) based on at on the composite image and/or the residue mask. For example, in one embodiment, the computing system 110 may determine the residue coverage parameter based on the percentage of the plurality of pixels classified as residue pixels (e.g., based on the percentage of the composite image covered by the residue mask). In another embodiment, the computing system 110 may divide the composite image and/or residue mask into a plurality of sections or regions. In such an embodiment, the computing system 110 may determine an initial residue coverage parameter (e.g., the percent residue coverage) associated with each section. Thereafter, the computing system 110 may determine the residue coverage parameter for the imaged portion of the field from the percentage of sections having initial residue coverage values exceeding a predetermined threshold. For example, in one embodiment, the composite image and/or residue mask may be divided into one hundred sections in a ten-by-ten grid, with a predetermined threshold of fifty percent. In such an embodiment, determined residue coverage is the percent of sections having over 50% residue.

In addition, at (224), the control logic 200 includes determining a residue evenness parameter associated with the image portion of the field. In general, the residue evenness parameter indicates how evenly the residue is distributed within the imaged portion of the field. As mentioned above, in some embodiments, the computing system 110 may determine an initial residue coverage parameter associated with each of a plurality sections of the composite image. In this respect, at (224), in such embodiments, the computing system 110 may determine the coefficient of variance of the determined initial residue coverage parameters. As is generally understood, the coefficient of variance is the standard deviation of the initial residue coverage parameters divided by the mean of the initial residue coverage parameters.

It should be appreciated that, upon determination of the residue coverage parameter and/or residue evenness parameters, the computing system 110 may be configured to perform any number of follow-up actions, including storing data associated with the determined residue coverage parameter and/or residue evenness parameters within its memory 114 and/or transmitting such data to a separate computing device (e.g., a remote server and/or a computing device associated with a corresponding agricultural machine, such as a vehicle controller). Such actions may also include generating a notification for display to an operator (e.g., via the associated user interface 130) that provides information associated with the determined residue coverage parameter and/or residue evenness parameters.

Additionally, as indicated above, the computing system 110 (or a separate computing system) may be configured to control the operation of an associated agricultural machine based on the residue coverage parameter and/or residue evenness parameters. For instance, when the imaging device(s) 104 are installed on an agricultural machine, the present subject matter may allow for real-time detection of residue coverage and/or evenness within a field as the machine traverses the field during the performance of an agricultural operation. In such an embodiment, adjustments of the operation of the agricultural machine may be made in real-time in response to the residue coverage and/or evenness determinations. For example, when the agricultural machine includes a tillage implement configured to perform tillage operation within the field (e.g., the implement 14 shown in FIG. 1), real-time adjustments may be made to the tillage parameters associated with the ground-engaging tools of the implement, such as by adjusting the penetration depth, down pressure/force, angle-of-attack, and/or the like of one or more of the ground-engaging tools.

Moreover, in embodiments in which the disclosed system is configured to capture both pre-tilled and post-tilled images of the field, the computing system 110 may be configured to compare and contrast the pre-tilled and post-tilled images to assess the effectiveness of a tillage implement in providing the desired residue coverage and/or residue evenness. For instance, when the initial residue coverage and/or residue evenness is determined based on a pre-tilled image of a given imaged portion of the field, a corresponding post-tilled image of such portion of the field may also be captured to determine whether the tillage operation has resulted in the desired change to the initial residue coverage and/or residue evenness.

Figure 6:
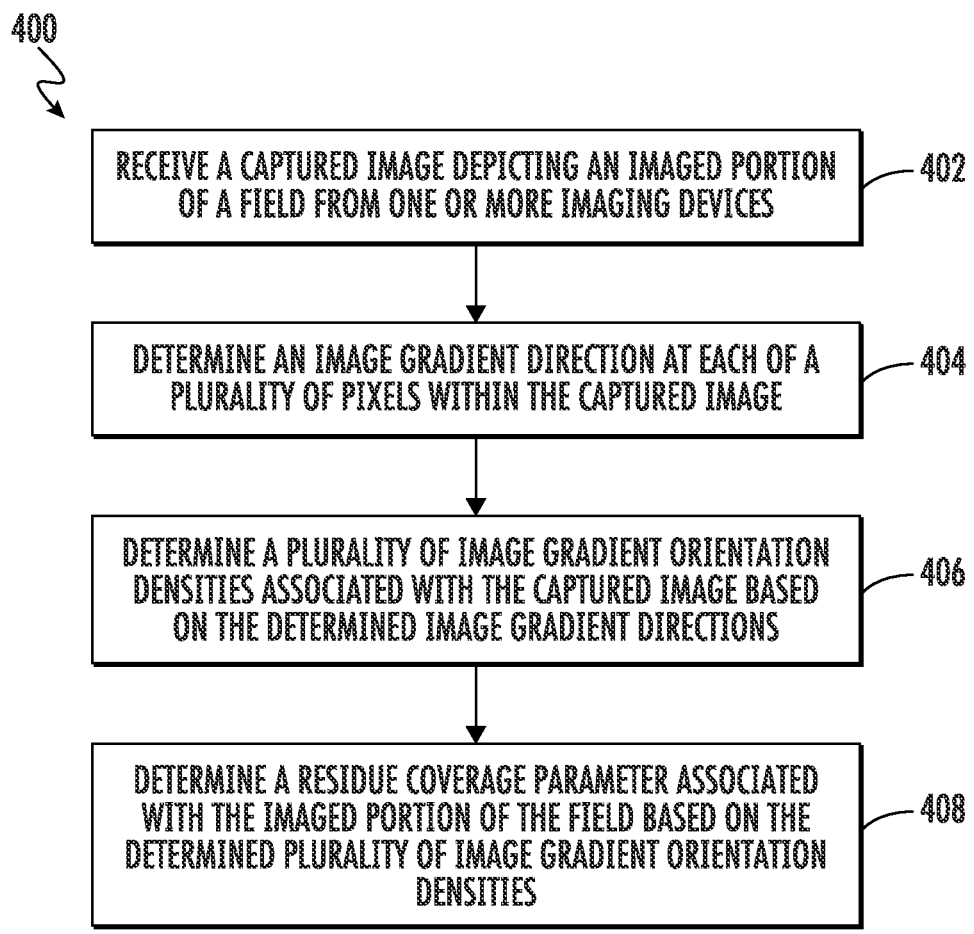
FIG. 6 illustrates a flow diagram of one embodiment of a method for determining residue coverage of a field in accordance with aspects of the present subject matter.

Referring now to FIG. 6, a flow diagram of one embodiment of a method 400 for determining residue coverage of a field is illustrated in accordance with aspects of the present subject matter. In general, the method 400 will be described herein with reference to the agricultural machine 10 shown in FIG. 1 and the various system components shown in FIG. 2. However, it should be appreciated that the disclosed method 400 may be implemented with agricultural machines having any other suitable machine configurations and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (402), the method 400 may include receiving, with a computing system, a captured image depicting an imaged portion of a field from one or more imaging devices. For example, as described above, the computing system 110 may be communicatively coupled to the imaging device(s) 104, thereby allowing images captured by the imaging device(s) to be transmitted to and received by the computing system 110.

Additionally, at (404), the method 400 may include determining, with the computing system, an image gradient orientation at each of a plurality of pixels within the captured image. For example, as described above, the computing system 110 may analyze or process the captured image to determine the image gradient orientation at each of a plurality of pixels within the captured image.

Moreover, at (406), the method 400 may include determining, with the computing system, a plurality of image gradient orientation densities associated with the captured image based on the determined image gradient orientations. For example, as described above, the computing system 110 may determine a plurality of image gradient orientation densities associated with the captured image based on the determined image gradient orientations.

Referring still to FIG. 6, at (408), the method 400 may include determining, with the computing system, a residue coverage parameter associated with the imaged portion of the field based on the determined plurality of image gradient orientation densities. For example, as described above, the computing system 110 may determine a residue coverage parameter (e.g., the percent residue coverage) associated with the imaged portion of the field based on the determined plurality of image gradient orientation densities.

It is to be understood that the steps of the control logic 200 and method 400 are performed by a computing system (e.g., computing system 110) upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as the control logic 200 and method 400, is implemented in software code or instructions which are tangibly stored on a tangible computer readable medium. The computing system loads the software code or instructions via a direct interface with the computer readable medium or via a wired and/or wireless network. Upon loading and executing such software code or instructions by the computing system, the computing system may perform any of the functionality of the computing system described herein, including any steps of the control logic 200 and method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A method for determining residue coverage of a field, the method comprising:
   receiving, with a computing system, a captured image depicting an imaged portion of a field from one or more imaging devices;
   determining, with the computing system, an image gradient orientation at each of a plurality of pixels within the captured image;
   determining, with the computing system, a plurality of image gradient orientation densities associated with the captured image based on the determined image gradient orientations; and
   determining, with the computing system, a residue coverage parameter associated with the imaged portion of the field based on the determined plurality of image gradient orientation densities.

2. The method of claim 1, further comprising:
   quantizing, with the computing system, each of the determined image gradient orientations as one of a predetermined plurality of image gradient orientations.

3. The method of claim 2, further comprising:
   generating, with the computing system, a plurality of binary images based on the quantized image gradient orientations, each binary image corresponding to one of the predetermined plurality of image gradient orientations such that each binary image depicts pixels of the plurality of pixels having the corresponding image gradient orientation.

4. The method of claim 3, further comprising:
   generating, with the computing system, a plurality of image gradient orientation density images based on the plurality of binary images; and
   generating, with the computing system, a composite image depicting a maximum local density of the image gradient orientations depicted within the plurality of image gradient orientation density images at the plurality of pixels.

5. The method of claim 4, further comprising:
   comparing, with the computing system, the maximum density depicted within the composite image for a given pixel of the plurality of pixels to a threshold density value; and
   when the maximum density exceeds the threshold density value, classifying, with the computing system, the given pixel as a residue pixel.

6. The method of claim 5, wherein determining the residue coverage parameter comprises determining, with the computing system, the residue coverage parameter based on a percentage of the plurality of pixels classified as residue pixels.

7. The method of claim 5, wherein determining the residue coverage parameter comprises:
   dividing, with the computing system, the composite image into a plurality of sections;
   determining, with the computing system, an initial residue coverage parameter associated each of the plurality of sections; and
   determining, with the computing system, the residue coverage parameter for the imaged portion of the field based on a percentage of the initial residue coverage parameters exceeding a predetermined threshold.

8. The method of claim 7, further comprising:
   determining, with the computing system, a residue evenness parameter based on the composite image.

9. The method of claim 8, wherein determining the residue evenness parameter comprises:
   determining, with the computing system, a coefficient of variance of the determined initial residue coverage parameters.

10. The method of claim 5, wherein the composite image depicts the image gradient orientation at which the maximum density occurs for each of the plurality of pixels.

11. The method of claim 3, further comprising:
    blurring, with the computing system, each of the generated plurality of binary images; and
    downsampling, with the computing system, each generated plurality of binary images.

12. The method of claim 1, wherein the one or more imaging devices are supported relative to an agricultural machine such that the images of the field are captured as the agricultural machine travels across the field, the method further comprising:
    initiating, with the computing system, a control action associated with adjusting the operation of the agricultural machine based on the determined residue coverage parameter.

13. A system for determining residue coverage of a field, the system comprising:
    an imaging device configured to capture images of a field; and
    a computing system communicatively coupled to the imaging device, the computing system including a processor and associated memory, the memory storing instructions that, when implemented by the processor, configure the computing system to:
    receive a captured image depicting an imaged portion of the field from the imaging device;
    determine an image gradient orientation at each of a plurality of pixels within the captured image;
    determine a plurality of image gradient orientation densities associated with captured image the based on the determined image gradient orientations; and
    determine a residue coverage parameter associated with the imaged portion of the field based on the determined plurality of image gradient orientation densities.

14. The system of claim 13, wherein the computing system is further configured to quantize each of the determined image gradient orientations as one of a predetermined plurality of image gradient orientations.

15. The system of claim 14, wherein the computing system is further configured to generate a plurality of binary images based on the quantized image gradient orientations, each binary image corresponding to one of the predetermined plurality of image gradient orientations such that each binary image depicts pixels of the plurality of pixels having the corresponding image gradient orientation.

16. The system of claim 15, wherein the computing system is further configured to:
generate a plurality of image gradient orientation density images based on the plurality of binary images; and
generate a composite image depicting a maximum local density of the image gradient orientations depicted within the plurality of image gradient orientation density images at the plurality of pixels.

17. The system of claim 16, wherein the computing system is further configured to:
compare the maximum density depicted within the composite image for a given pixel of the plurality of pixels to a threshold density value; and
when the maximum density exceeds the threshold density value, classify the given pixel as a residue pixel.

18. The system of claim 17, wherein, when determining the residue coverage parameter, the computing system is further configured to determine the residue coverage parameter based on a percentage of the plurality of pixels classified as residue pixels.

19. The system of claim 17, wherein, when determining the residue coverage parameter, the computing system is further configured to:
divide the composite image into a plurality of sections;
determine an initial residue coverage parameter associated each of the plurality of sections; and
determine the residue coverage parameter for the imaged portion of the field based on a percentage of the initial residue coverage parameters exceeding a predetermined threshold.

20. The system of claim 16, wherein:
the imaging device is supported relative to an agricultural machine such that the images of the field are captured as the agricultural machine travels across the field; and
the computing system is further configured to initiate a control action associated with adjusting the operation of agricultural machine based on the determined residue coverage parameter.

* * * * *